United States Patent [19]

Eagen et al.

[11] Patent Number: 5,201,033

[45] Date of Patent: * Apr. 6, 1993

[54] METHOD FOR CONTROLLING CURSOR MOVEMENTS ON CERTAIN COMPUTER WORKSTATIONS

[75] Inventors: Stephen T. Eagen; Harvey G. Kiel, both of Rochester, Minn.

[73] Assignee: International Business Machines Corporation, Armonk, N.Y.

[*] Notice: The portion of the term of this patent subsequent to Mar. 23, 2010 has been disclaimed.

[21] Appl. No.: 466,151

[22] Filed: Jan. 17, 1990

[51] Int. Cl.$^5$ .............................................. G06F 15/20
[52] U.S. Cl. ..................................... 395/155; 395/149
[58] Field of Search ...................... 340/709, 721, 724; 364/518, 521, 523, 200, 900; 395/148, 149, 155, 157, 161, 163, 275, 500

[56] References Cited

U.S. PATENT DOCUMENTS

| | | | |
|---|---|---|---|
| 4,204,206 | 5/1980 | Bakula et al. | 340/721 |
| 4,538,225 | 8/1985 | Banks et al. | 364/200 |
| 4,625,294 | 11/1986 | Banks | 364/900 |
| 4,642,794 | 2/1987 | Lavelle et al. | 364/900 |
| 4,710,762 | 12/1987 | Yamada | 340/721 |
| 4,724,521 | 2/1988 | Carron et al. | 364/200 X |
| 4,733,351 | 3/1988 | Peirent | 395/144 |
| 4,783,759 | 11/1988 | Borgendale et al. | 364/900 |
| 4,954,966 | 9/1990 | Mooney et al. | 395/157 |
| 4,967,190 | 10/1990 | Fujisaki et al. | 340/700 |

OTHER PUBLICATIONS

Okada Takayuki, Japanese Patent Abstract, Publication Number JP2165316, Jun. 26, 1990.
Sugaya Tetsuo, Japanese Patent Abstract, Publication Number JP58208861, Dec. 5, 1983.

*Primary Examiner*—Heather R. Herndon
*Attorney, Agent, or Firm*—Palmatier, Sjoquist & Helget

[57] ABSTRACT

A process for controlling cursor display information for a plurality of dependent workstations from a remote processor or workstation controller, including the steps of prestoring format tables for each dependent workstation in the remote workstation controller, processing cursor movement keystroke signals received from any of the plurality of dependent workstations within the workstation controller to define and position the cursor at an input-capable position for any dependent workstation when a cursor movement keystroke is made in that workstation, and transmitting commands from the remote workstation controller to the keystroke-initiating dependent workstation to display and position either a text cursor or a selection cursor.

6 Claims, 7 Drawing Sheets

_Fig. 2_

_Fig. 3_

Fig. 5

```
            BUDGET REPORT OPTIONS

SELECT REPORT TYPE, FISCAL PERIOD, AND ONE OR MORE BUDGET ACCOUNTS.

REPORT TYPE            1. SPREAD BY MONTH
                            2. SPREAD BY ACCOUNT
                            3. TRANSACTIONS LISTING
                            4. YEAR-END PROJECTIONS

FISCAL PERIOD          ________________

BUDGET ACCOUNTS    CABLE TV    GROCERIES    STOCKS

CAR         HOUSE        TAXES

CHARITIES   INSURANCE    UTILITIES

CLOTHES     INTEREST     WAGES

GIFTS       RECREATION

ENTER  F12= CANCEL HELP   F3= EXIT
```

*Fig. 6*

```
    @ SELECT ACCOUNT @     @ 1. CHECKING     @
                           @ 2. SAVINGS      @
                           @ 3. CREDIT CARD  @
                           @ 4. CASH         @

@ FISCAL PERIOD @      @ _____________ @
```

METHOD FOR CONTROLLING CURSOR MOVEMENTS ON CERTAIN COMPUTER WORKSTATIONS

BACKGROUND OF THE INVENTION

The present invention relates generally to computer workstations which are connected for information interchange with host or mainframe computer systems; more particularly, the invention relates to a method for controlling cursor movement and display on certain computer workstations in order to provide a consistent user interaction between workstation types.

Historically, operator interface with a mainframe computer system evolved from a single operator control console which was attached to the mainframe structure. The operator control console amounted to little more than a keyboard for enabling the operator generation of simple input commands, and a display screen for enabling the mainframe computer to present simple status messages to the operator. The evolution and expansion of this concept led to the development of multiple, limited-intelligence terminals, to enable a number of users to communicate with a mainframe system, wherein the multiple terminals were perhaps remotely positioned from one another, and from the mainframe system, but commonly connected to a controller, and the controller was connected to the mainframe computer system. However, the multiple terminal concept was a relatively low cost solution to enable multiple users to communicate with a mainframe computer system, but with limited intelligence contained within each terminal, so that the user communication was restricted to relatively simple input/output transfers.

The development of the stand-alone personal computer (PC) provided a high level of internal intelligence to enable a great many user interface functions to be added to the PC, with the result that the PC became a very "user friendly" device. Among the interface enhancements which were made possible by the PC development were enhanced cursor controls, the creation of selection cursors, and instantaneous cursor scrolling on the display screen.

The user friendly PC soon became adapted for communication with host computer systems, initially by connecting the PC to a controller, and by writing software to enable the PC to emulate a terminal with limited intelligence, normally connectable to the controller. Eventually the PC/mainframe interface was developed to enable a PC to communicate more or less directly with a host processor, wherein the independent intelligence contained within a PC could be used both to enhance the user interface with the host system and to independently execute software apart from the host system. A class of terminals evolved utilizing these concepts, which became known as "intelligent" terminals, and the previously evolved, limited-intelligence terminals became known as "dumb" terminals. By virtue of the widely varying internal intelligence of these two types of terminals, the capabilities and rules for using the terminals also became widely varied.

A great deal of effort has been spent in attempting to develop a set of rules for common usage of computer workstations, even though the hardware designs of such workstations may be widely varied. The basis for this effort is to simplify the rules for users of these workstations, thereby reducing the amount of time required by a user in understanding the interaction with the workstation. A further basis is to allow a common programming interface to drive presentation management functions independent of workstation device types. In an idealized situation, the rules for user access and interaction would be identical for all workstations, regardless of the level of hardware design sophistication of any particular workstation However, the idealized situation is difficult to achieve, because of the differences in hardware design sophistication between and among workstations. The so-called "intelligent" class of workstation inherently includes a hardware design which is capable of a full range of independent computer operations; the so-called "dumb" workstation typically includes only enough hardware design to enable operator interaction through a keyboard and display screen for communicating simple information and commands. For example, International Business Machines (IBM) has classified the universe of "intelligent" workstations under the heading of "independent workstations" or programmable workstations (PWS), and the second category under the designation of "dependent workstations" (DWS), or non-programmable workstations The PWS is inherently capable of performing a relatively high level of independent computer operations, whereas the DWS is essentially capable of merely receiving command and control information from a host computer, displaying it, and transferring operator keystroke data back to the host computer via a controller. Naturally, the cost of a PWS is significantly higher than a DWS, although for a great number of computer applications the limited sophistication of a DWS is adequate for the task at hand. It is not unusual for a computer purchaser to initially utilize one or more DWS devices connected to a host computer, and then later replace these devices with PWS devices. It is also not unusual to have both DWS and PWS devices connected to the same host computer system.

A PWS is typically a complete computer processing system, and may have a built-in media device such as a diskette or hard disk. A PWS can therefore run stand-alone processing applications in the workstation, and can communicate independently with a host computer system through standard communications connections. In contrast, a DWS is connected to a host processing system through a workstation controller (WSC), and in a typical system arrangement a single WSC is connected to and supports a considerable number of DWS terminals The WSC communicates with the host processor through local bus or remote communications connections, but each DWS is attached to the WSC via a communications cable. The DWS can operate only on host-based computer processing applications, and has only a limited internal capability to provide enhanced user interface functions. Whereas a PWS typically has 1–16 or more megabytes of internal memory, the DWS internal memory is minimal. The PWS can always store at least the data required for assembling or constructing one or more screen display images in its internal memory, whereas the DWS can only store the data to refresh the screen image currently being displayed, and therefore each time the display screen is changed in a DWS the change must be initiated by the host processor.

In any typical system utilizing a host processor and workstations, wherein the workstations are utilized for user interaction and access, the host processor provides certain fundamental information. For example, the host processor may generate a data stream containing information to be displayed on a workstation screen, and further information for controlling the presentation of the data on the screen. Certain screen attributes may be dictated by the host processor, and the workstation controller may initially position a text cursor and change the cursor presentation, i.e., to a blinking or no blinking mode, or to or from a single character reverse image display, and it may move the screen display data. The workstation controller may poll the workstation to determine whether a keystroke should be recognized or whether any of a predetermined number of commands have been accepted In the case of a PWS, the host processor data stream is sent directly to the workstation and is processed internally in the workstation, which itself contains sufficient internal memory and program data to directly control the interaction with the display screen and keyboard. In the case of the DWS, the host processor data stream is sent to a workstation controller (WSC), and the WSC provides the internal memory and control for directly controlling the display screen of the DWS. This results in a more limited set of options available to the user of a DWS, than is available to the user of a PWS.

It would be a distinct advantage to the users if the DWS and PWS terminals could be operated under the same set of user interaction rules, and manufacturers strive continuously for this result. For example, IBM has defined a "common user access" (CUA) for use with IBM's Systems Application Architecture (SAA), which has been published in IBM Publication No. SC26-4351-0 under the title "Common User Access Panel Design and User Interaction." This publication sets forth a set of common user access specifications to attempt to achieve consistency among the various types of workstation designs. However, the specification distinguishes, in a number of important respects, the rules for user access to PWS terminals versus DWS terminals. It would be an advantage if the number of instances of differences between such terminals could be reduced or even eliminated, to enable users to have the same understanding regarding access to a system, regardless of the degree of design sophistication of the user's workstation. The foregoing publication distinguishes PWS terminals as "programmable workstations" and DWS terminals as "nonprogrammable terminals." A nonprogrammable terminal is defined as a terminal attached to a host processor via a workstation controller, in which all or most of the user interface functions are controlled by the host.

The user interaction with a terminal, and therefore with the host computer, is accomplished via a user-operated keyboard and a display screen. In a PWS the user interacts with the display screen by means of a selection cursor, which highlights a selection field choice displayed on the screen to provide a focal point for user interaction with the screen, or by means of a text cursor, which indicates a character position within an entry field on the screen. In a PWS the selection cursor appears on the screen as a form of emphasis or highlighting, such as reverse color, and the selection cursor may highlight an entire selection field choice or an entire entry field. In a prior art DWS terminal there is no fully comparable selection cursor, and the text cursor is used to perform a more limited function. The text cursor is a marker which may be movably positioned to character positions on the screen, to point to character choices or for entering information from the keyboard at the desired location.

A more sophisticated set of rules and definitions may be utilized for the cursors on a PWS, because the PWS internal design provides for sufficient memory and control to regulate the selection cursor and text cursor functions; the lack of such sophisticated memory and control in a DWS requires that the function of the cursor be limited to basic character cursor functions. Therefore, a user operating a PWS will interact with the system differently than a user operating a DWS, and the user having access to both types of devices must be aware of the different sets of rules for such interaction. It would be an advantage if such rules could be consistently defined and applied, to enable the user to utilize the cursor activation rules defined for a PWS, even in situations where the user was interacting with a DWS.

SUMMARY OF THE INVENTION

The present invention provides a method for enabling a user to interact via a selection cursor and text cursor according to the rules set forth for a PWS, when the user is operating a DWS. The invention adopts the rules for PWS use of these cursors, wherein certain keyboard cursor movement keys cause predefined cursor actions, and applies them to DWS devices. The increased memory and control which is required for the higher level of cursor sophistication is accomplished by DWS interaction with a workstation controller (WSC), and by utilizing the more sophisticated design capabilities of the WSC for controlling the screen display at a DWS. Certain DWS keystrokes are transferred as commands to a WSC, resulting in a WSC-initiated sub-program to assemble a subset of screen commands, which are then transmitted to the DWS for controlling actual screen displays. The user may initiate such DWS keystrokes, according to the rules for operating a PWS, and the user therefore obtains a PWS-type interaction with the screen, which interaction is actually developed by subroutines within the WSC and transmitted to the DWS via its normal connection protocol.

It is the principal object of the present invention to provide a user interface capability for cursor movement which is the same for DWS devices as it is for PWS devices.

It is a further object of the present invention to upgrade the apparent sophistication of a DWS, to enable it to comply with the PWS rules for common user access.

BRIEF DESCRIPTION OF THE DRAWINGS

The foregoing and other objects and advantages of the invention will become apparent from the following specification, and with reference to the claims and the appended drawings, in which:

DESCRIPTION OF THE PREFERRED EMBODIMENT PROGRAMMABLE WORKSTATION

Figure 1:
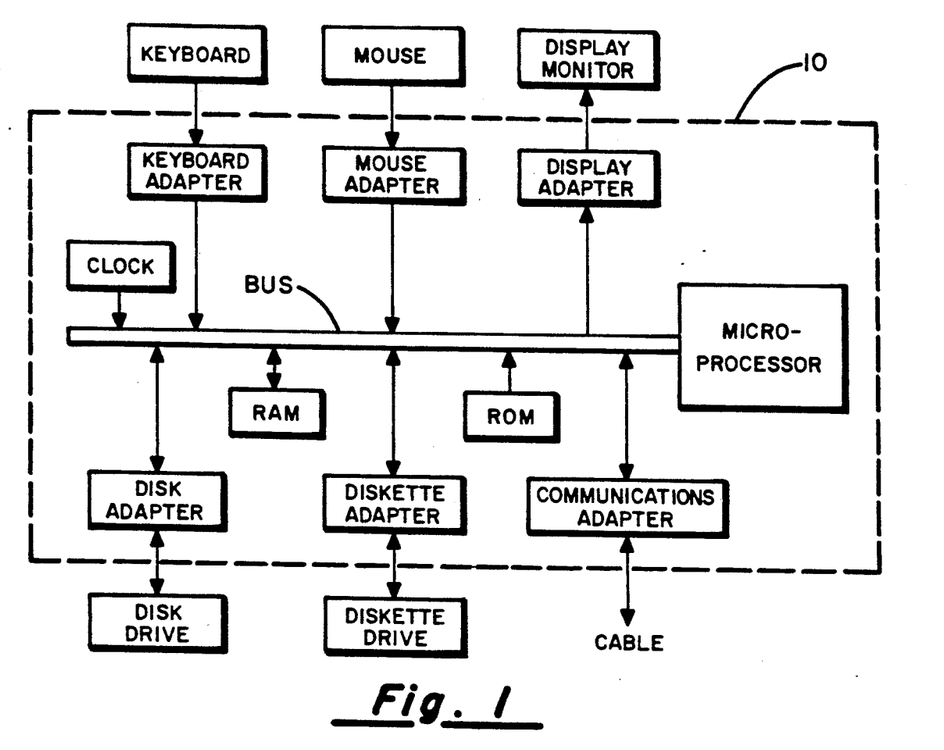
FIG. 1 shows a typical block diagram of a PWS.

Referring first to FIG. 1, there is shown a typical block diagram of a PWS; the circuits within the dotted outline 10 are generally found on one or more circuit boards within the PWS framework. The microprocessor is typically an Intel type 80286 or 80386, or equivalent microprocessors by other manufacturers. The microprocessor has an external bus which may communicate with a number of adapters which themselves are connectable to various internal and external devices. The typical PWS will have a keyboard and/or mouse connected through an adapter to the internal bus, a display monitor connected through an adapter to the internal bus, one or more disk or diskette adapters coupled to one or more disk or diskette drives and connected to the internal bus, and a communications adapter which is connectable to other systems via external cables. The RAM is typically a random access memory having 1–16 megabyte capacity, which is sufficiently large to store a complete operating system, an extensive work area for programmable calculations, a monitor screen buffer area and an area for executing application programs. The ROM is a read only memory which typically contains coding for initializing the machine, for performing diagnostic operations, and for controlling the basic I/0 system; the ROM is typically 64–128 kilobytes in capacity. The PWS is therefore operable as a stand-alone computer system, or as an independent workstation which may be connected to a host computer via external cables. The capabilities of the PWS enable it to provide a wide variety of user enhancements, including a full range of cursor controls, instantaneous scrolling, and display screen modification. All of these enhancements are contained and controlled within the PWS itself, although when a PWS is connected to a host computer processor and is operated as a workstation, it receives its overall command and control from the host processor. For example, the host processor may transmit data representative of display screen content to the PWS, and may identify the formats by which the data is to displayed and controlled, but once the PWS receives the broad directions from the host processor the PWS itself generates the internal control signals for regulating the actual data display on the display monitor.

DEPENDENT WORKSTATION

Figure 2:
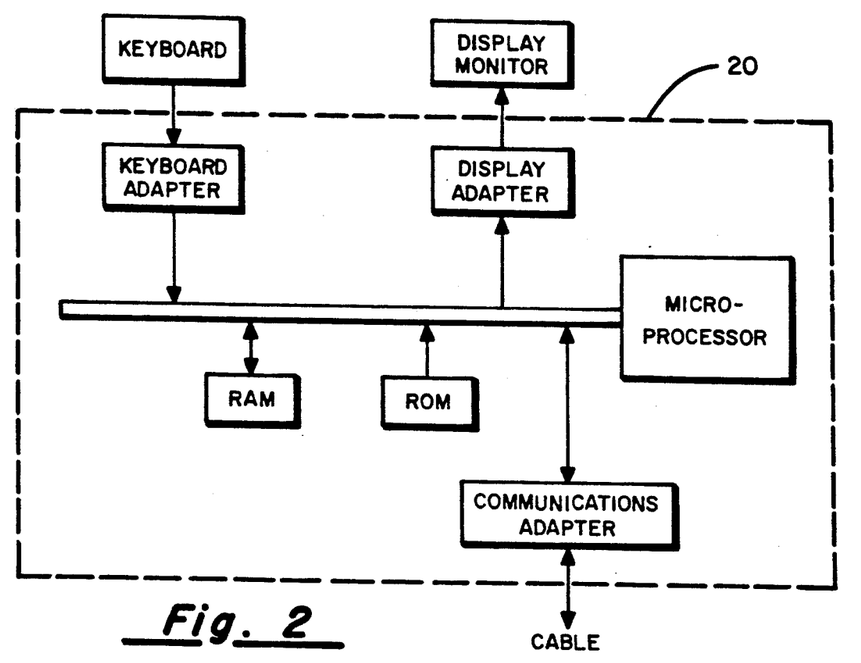
FIG. 2 shows a typical block diagram of a DWS.

FIG. 2 shows a typical block diagram of a DWS, wherein the circuits typically found within the framework are designated within dotted outline 20. The microprocessor is typically an Intel type 8088 or 8086 circuit device, or equivalent, and the microprocessor has an external bus which is connectable to several adapters for enabling communications with a limited number of external devices. For example, a keyboard adapter enables communications between the microprocessor and a keyboard, a display adapter enables information to be transferred to a display monitor, and a "communications" adapter enables communications to be made between the DWS and a host controller. The RAM is typically capable of 3–5 kilobytes of storage, for storing a screen buffer, and for providing a limited amount of memory work area for internal processing. The ROM is typically about 8 kilobytes in capacity, for storing coding relating to power-on processing, diagnostics, and character generation patterns and process communication protocols for communicating with other systems. The DWS is incapable of any significant internal processing beyond that which is required to interface with the keyboard and display monitor, and to communicate via the communications adapter. Therefore, all of the information displayed on the display monitor must be provided via the communications adapter to the RAM, and the microprocessor will generate sufficient internal control to display the information on the display monitor. Similarly, all keystrokes from the keyboard are temporarily received in the RAM, subject to activation of the communications adapter for transmission of the keystroke information over the cable to the WSC.

WORKSTATION CONTROLLER

In typical systems, the function of a "workstation controller" is to provide information transfer and control to a plurality of remote terminals from a single host processor. This function is usually performed by a hardware and software package which is uniquely identified and separate from the host processor hardware and software packages. The hardware for a workstation controller is typically contained on a circuit board package or packages which is pluggable into a host processor card slot, and the software for a workstation controller is typically executed by the hardware independently of software which is executed by the host processor. However, in certain systems, the function of a "workstation controller" is entirely a software package function, the software being executed within the host processor hardware. Although the preferred embodiment of the present invention is disclosed with respect to the workstation controller concept which is physically separate from the host processor in both hardware and software details, the invention is applicable to the second type of workstation controller, wherein the functions are performed entirely by a software package residing in a host processor.

Figure 3:
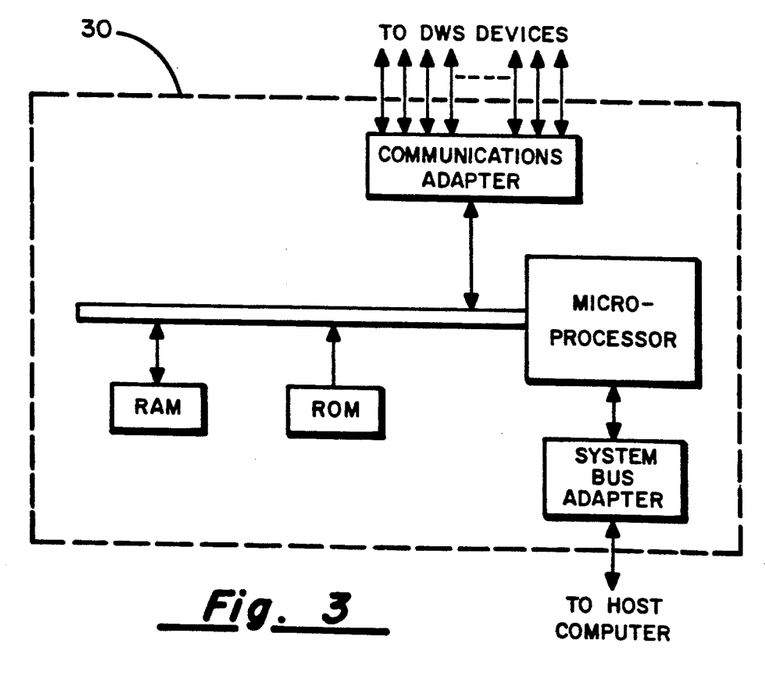
FIG. 3 shows a typical block diagram of a workstation controller.

FIG. 3 shows a typical block diagram of a workstation controller, of the type which typically communicates with a plurality of DWS devices. The workstation controller has a number of circuits contained within a package designated by dotted outline 30, and a microprocessor which is typically an Intel type 80826 circuit chip, or equivalent. The WSC microprocessor is typically connected to a system bus adapter which itself may communicate with a host computer processor. The WSC also has an internal data bus and a RAM having a capacity of 0.5–2.0 megabytes, and a ROM having a capacity of about 16 kilobytes, containing coding for initializing the WSC and for diagnostics relating to the WSC. The internal data bus of the WSC is connected to a communications adapter, which is externally connected to a "fan-out" multiplexer for enabling a plurality of DWS devices to communicate with a single WSC. In a typical application, the fan-out circuits are connectable to up to 40 DWS devices, and the screen display information for each of these DWS devices is stored within the WSC RAM memory. Likewise, keystroke signals from all of the DWS devices are received by the WSC and stored within the RAM, for subsequent communication to the host processor or for internal processing by the WSC.

Figure 4:
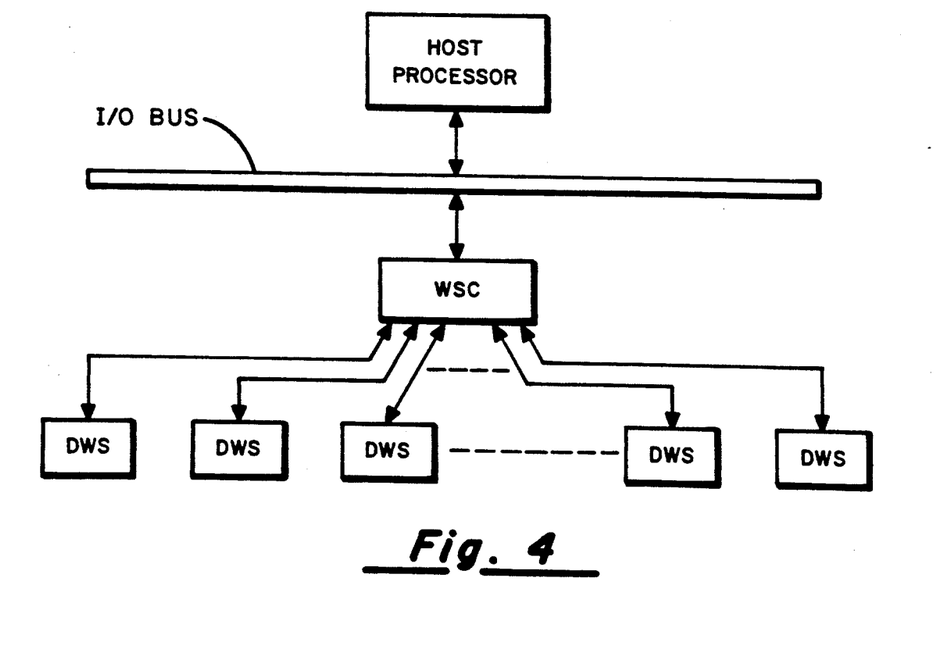
FIG. 4 shows a typical block diagram of a plurality of DWS devices connected to a host computer via a WSC.

FIG. 4 shows a typical block diagram of the system interconnections, wherein the host processor communicates with a WSC via an I/0 bus, and a WSC communicates with up to 40 DWS devices via communications cables. Other devices and controllers may be connected to the I/0 bus for communication with the host processor.

Figure 5:
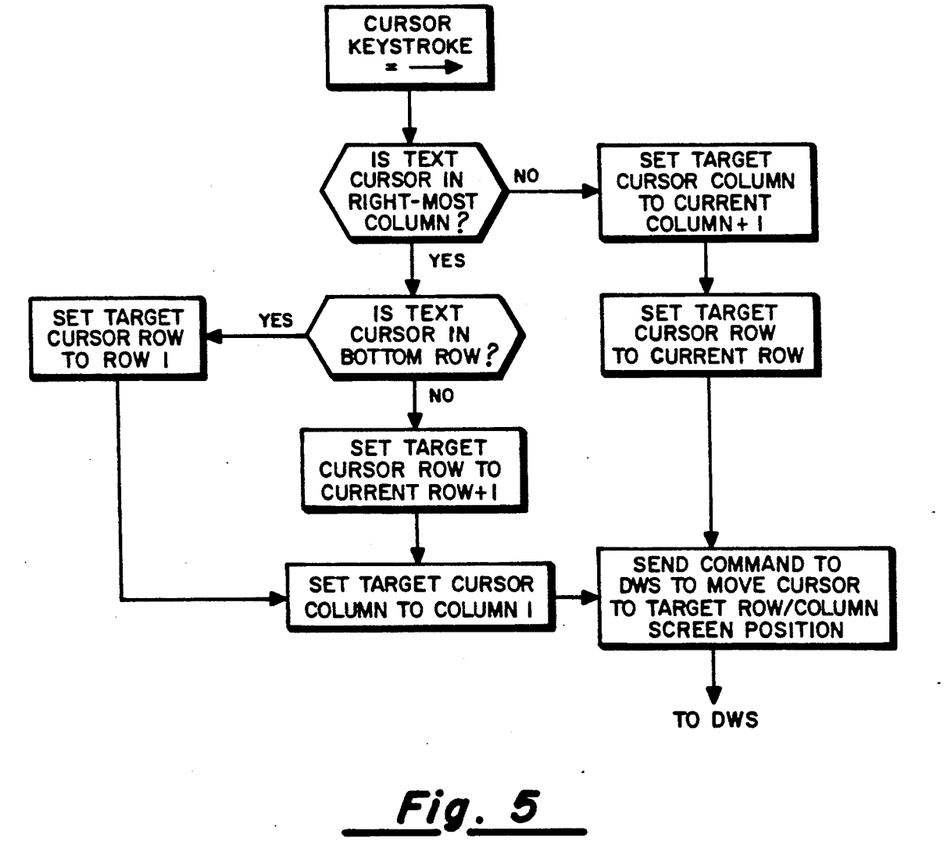
FIG. 5 is a flow chart showing prior art cursor movement control in a DWS.

Under typical operating conditions in the prior art, the host processor will construct a screen display for each of the DWS devices to which it is connected, the host processor will then transfer the data representative of each screen display to the WSC, where it is retained within a section of RAM identifiable with each particular DWS. The WSC then transfers the screen display data to each of the DWS devices, and each DWS device contains sufficient internal storage to retain the screen display data for purposes of presenting the display image to the user. Included in the display image data will typically be information relating to the position of the cursor, which in the case of a prior art DWS device is merely a character or text cursor. The WSC transmits this cursor information to the DWS, including the appearance and location of the cursor on the screen. If a DWS user makes a cursor movement keystroke, the DWS indicates that the DWS has keystroke data available for transfer to the host processor. The WSC makes the transfer of this keystroke data when polling the DWS, and transmits a new text cursor position back to the DWS. The WSC retains in its internal memory and control information relating to all of the screen display images with which it is dealing, and information relating to all of the cursor position information for the various DWS devices it is interacting with. It transmits to and receives this information from the host processor upon command Cursor Movement Control—Prior Art FIG. 5 shows an example of the prior art processing required for controlling cursor movement and position in a DWS. By way of example, the "right arrow" keystroke is assumed, and the processing illustrated in FIG. 5 begins when the user makes the keystroke on a DWS. The signal representative of "right arrow" keystroke is transferred to the WSC wherein the signal is first identified as a right arrow keystroke. The WSC then refers to its internal storage, which contains a record of the current cursor position on the DWS. From this information, the WSC makes a determination of whether the cursor is in a rightmost column on the screen. If it is not, the "target" cursor column indicator is increased by one and the "target" cursor row is set to the current value of the cursor location, and a command is sent to DWS to move the cursor to the target row and column screen position. If the initial determination was that the cursor was already in the rightmost column, then the cursor position is examined to determine whether the cursor is also in the bottom row of the screen. If it is not, the target cursor row indicator is increased by one, and the target cursor column is reset to column one, and a command is sent to the DWS to move the cursor to the new target row/column screen position. If the determination of cursor position indicated that the cursor was already in the bottom row of the screen, then the target cursor row would be reset to row one, and the target cursor column would be reset to column one, and command would be sent to the DWS to move the cursor to the new target row/column screen position. All of the foregoing processing operations are performed with the DWS merely receiving a command to position the cursor to a specified row and column position on the screen. By contrast, in a PWS, a signal indicating the desired cursor position would be sent to the PWS from the host processor and the internal keystroke processing shown in FIG. 5 would all be accomplished within the PWS to control and position the cursor on the screen, according to the common user access rules.

If the PWS Common User Access (CUA) rules are to be applied to a DWS, the problem of cursor definition, position and control become greatly complicated. The relatively simple analysis routine described above with reference to FIG. 5 becomes greatly magnified because under the CUA rules the screen itself becomes subdivided into separate space areas, defined as "panel areas," and the rules for cursor movement and control vary between and within individual panel areas. For example, the concept of a "selection" cursor is introduced, to highlight certain display characters and words; in addition, the text cursor continues to be used, but only in input-capable areas of the screen and according to predefined rules. An "input-capable" area of a screen is an area where the software permits a user to enter data. Therefore, when a user makes a cursor movement keystroke on the keyboard the type and position of cursor which will appear is dependent upon the CUA conventions for the particular panels being displayed, and is also dependent upon the particular cursor keystroke movement which is made. In a PWS device the added complexity of processing cursor information is readily handled within the processor capabilities inherent to the PWS device. However, in a DWS device there is no comparable processor capability, and the DWS device could not be used with all of the enhancements described in the Common User Access conventions. Of course, the DWS processing capabilities could be expanded to enable it to handle the additional cursor definition and control functions, but this would defeat the very basis for utilizing DWS devices; namely, to provide a simple, low-cost terminal for user access. The perceived advantage in utilizing DWS devices as user access terminals is that their low cost permits a great many devices—up to 40—to be connected to a host computer via a single WSC. Multiple WSC's may be used in a system to enable attachment of hundreds of DWS devices to the host computer. Therefore any increase in the cost of a single DWS, by way of increasing its processing capabilities, is multiplied many times over when considered in the context of a larger system.

Furthermore, there already exists a large inventory of DWS equipment, and DWS-based applications. Any significant changes to the basic design of the DWS device could greatly and seriously prejudice the viability of pre-existing DWS devices.

CURSOR MOVEMENT CONTROL—NEW PROCESS

The present invention solves this dilemma by placing the processing capabilities required for enhanced cursor definition and control in the WSC, thereby utilizing the WSC processing capability on a time-shared basis with a plurality of DWS devices. Therefore, cursor definition and control may be processed by the WSC for each of the DWS devices connected to it, each time the need for such processing arises. If increased memory or control is needed for these enhanced cursor functions, it need be placed in only a single device—the WSC—rather than a plurality of DWS devices.

In order for the WSC to perform the processing required to support the enhanced cursor definition and movement on a DWS, it must save the definition of the panels currently being displayed on the DWS screen, and thereby the location of all cursorable items presented in each panel. Cursorable items include entry field positions, selection field choices, list entries, and cursorable text items. The particular rules defining these items are found in the foregoing IBM publication "Common User Access Panel Design and User Interaction." In general, a cursor movement keystroke on a DWS keyboard is signaled to the WSC, and the WSC interprets the keystroke in light of the CUA rules and definitions relating to the particular panel being displayed, and generates the display type and position commands back to the DWS to cause the cursor to properly move in the direction specified by the keystroke. The operation is described by example, with reference to FIG. 6, which illustrates a typical panel display according to the conventions of CUA. The panel display of FIG. 6 contains a single-choice selection field (Report Type), an entry field (Fiscal Period), and a multiple choice selection field (Budget Accounts), which is an input field containing a list of choices from which the user may select. In addition, the display screen may contain a top line, above the title "Budget Report Options," which is defined under CUA convention as an "action bar" (not shown in FIG. 6), which generally provides visual cues that helps the user select the desired action. Further, the display screen contains a lower area known as a "function key area" which displays the list of function key assignments associated with the panel being displayed.

Figure 6:
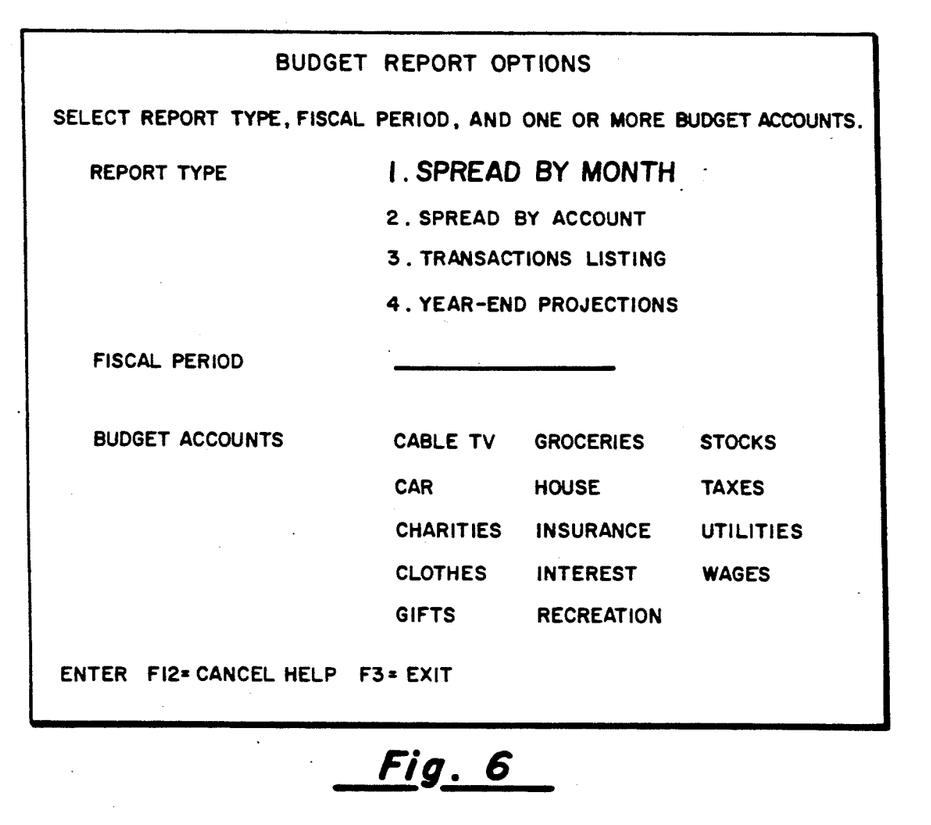
FIG. 6 shows a representative display panel.

The selection cursor is initially positioned over the first choice in the first panel field (Report Type), which is indicated in FIG. 6 by highlighting. No text cursor is initially displayed. The user can move the selection cursor down through the list of choices by either a "right arrow" cursor keystroke or a "down arrow" cursor keystroke; when either of these keystrokes is made, the selection cursor will move downward to the next selection choice. When the selection cursor is positioned on the bottom choice in the selection field, additional "down arrow" or "right arrow" keystrokes will cause a text cursor to become activated and positioned in the first position of the (Fiscal Period) entry field. The selection cursor may or may not become deactivated when the text cursor is positioned within the entry field, depending upon the particular programming rules adopted by the programmer.

Within the entry field, the right and left arrow keystrokes cause the text cursor to move one character position for each keystroke. If the text cursor is in the first position of the entry field and the "left arrow" keystroke is made, the text cursor becomes deactivated and the selection cursor will be displayed on the last choice in the (Report Type) selection field. If the text cursor is in the last position of the entry field, the "right arrow" or "down arrow" keystroke will cause the text cursor to become deactivated and the selection cursor to become activated and positioned on the first choice in the (Budget Account) field.

In the (Budget Account) field, the "right arrow" or "left arrow" keystrokes cause the selection cursor to move to the next word choice right or left within the current row of choices. At either end of the current row, the keystroke will move the selection cursor to the next or previous row, depending upon the keystroke. The "arrow up" or "arrow down" keystrokes will cause the selection cursor in the (Budget Account) field to move to the next choice up or down within the current column of choices; at either end of a column, these keystrokes will cause the selection cursor to move to the next or previous column, depending upon the keystroke.

From the foregoing example it can be seen that the type of cursor, selection or text, and the position and movement of the cursor, depend not only upon the relative last position of the cursor on the screen, but also upon the contents of the screen itself, and upon the definitions set up for each of the panel areas displayed on the screen. In order for this type of enhanced cursor definition and selection to be accomplished on a DWS, all of the rules for processing must be prestored in a WSC. Furthermore, since a WSC can interact with up to 40 DWS devices, the WSC must have an independent processing area reserved for each DWS.

Figure 7A:
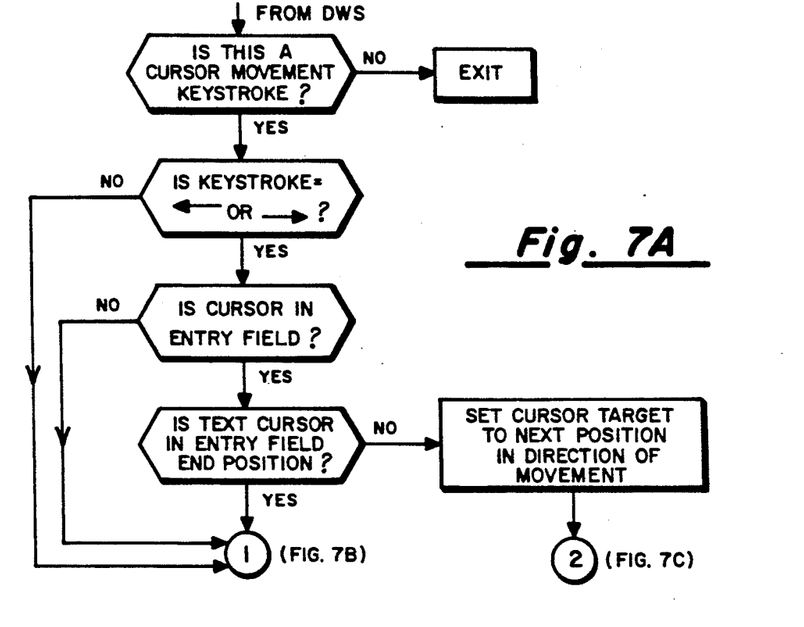
FIGS. 7A, 7B and 7C are flow charts showing cursor movement control in a DWS according to the invention.
Figure 7B:
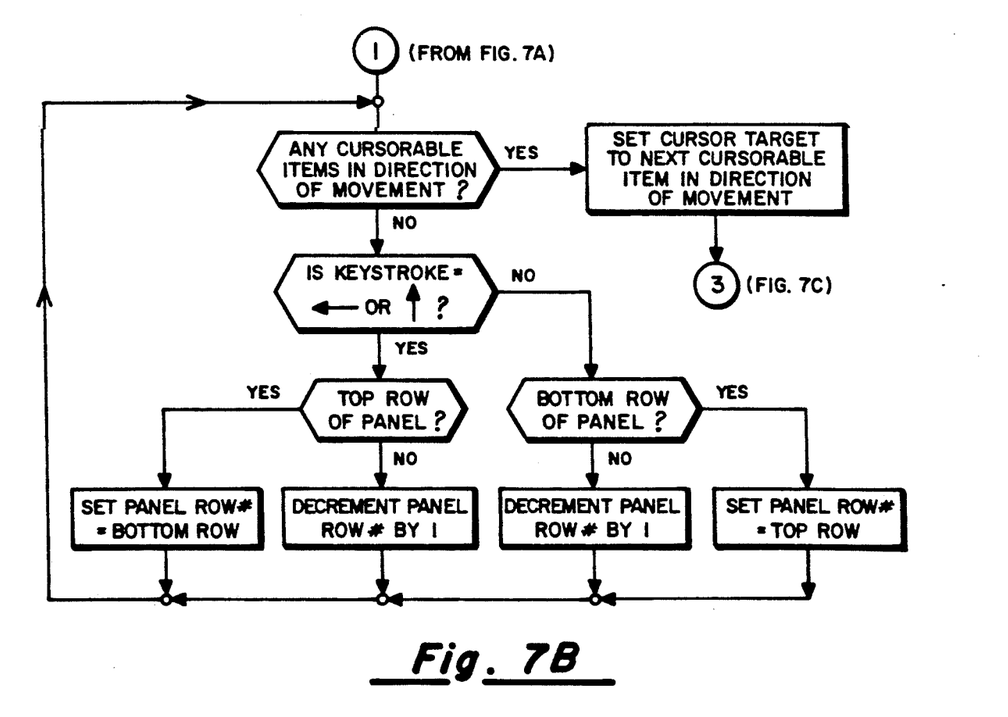

The specific programming requirements for communicating between a workstation controller and a typical host computer processor, and ultimately with a DWS, is described in IBM Publication No. SA21-9247-6, entitled "IBM 5250 Information Display System—Functions Reference Manual." This information is incorporated by reference herein, as a disclosure of the required programming formats and data interchange. However, in addition to the disclosure therein, the present invention requires implementation of additional processes, which may be incorporated into the software of the WSC. FIGS. 7A and 7B are flow charts illustrating the additional processes.

Figure 7C:
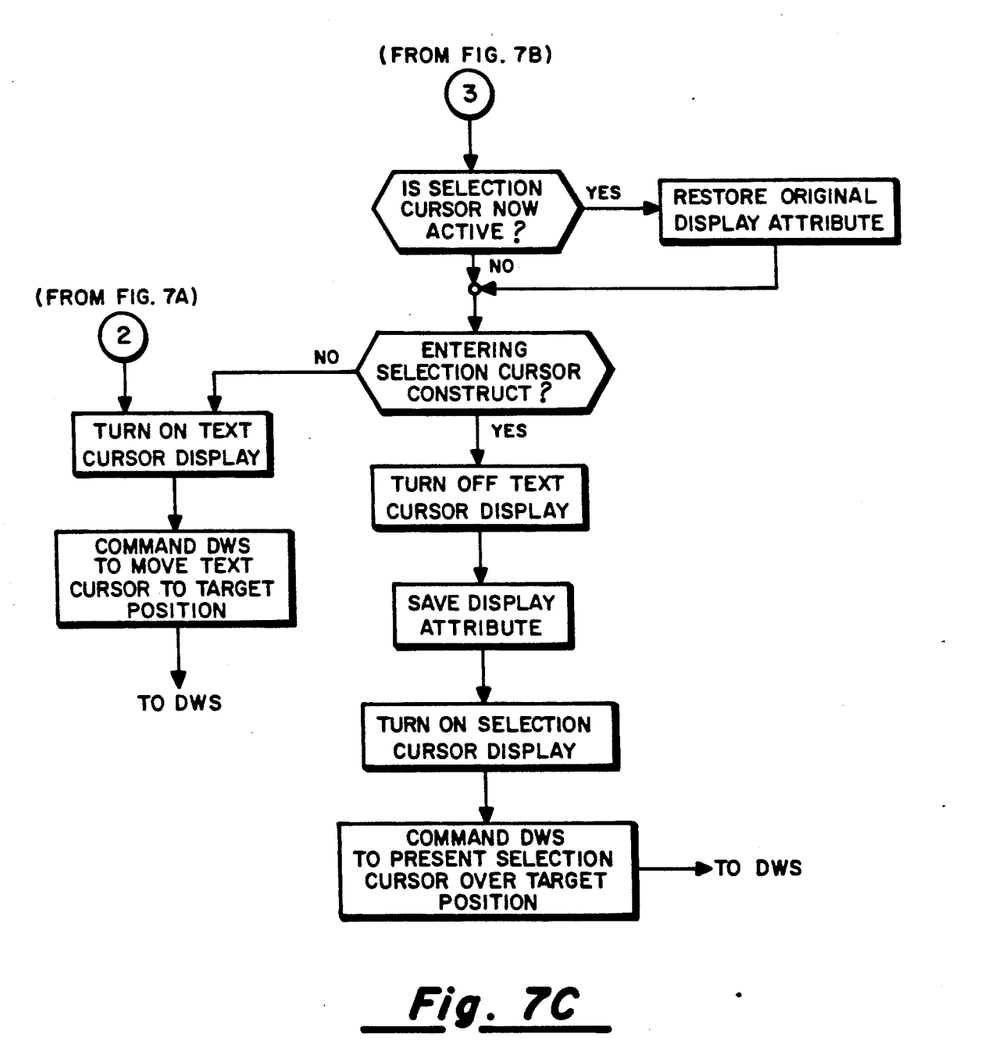

Referring to FIGS. 7A through 7C, a cursor movement keystroke by the user at the DWS results in a signal being received by the WSC (FIG. 7A), which signal initiates the process steps illustrated. The WSC processor first determines whether the keystroke received from the DWS is a cursor movement keystroke, or some other keystroke which requires transfer to the host processor. If the keystroke is a non-cursor movement keystroke, an exit is made from the subsequent process steps, and the keystroke is handled according to conventional techniques.

If the WSC determines that the received keystroke is a cursor movement keystroke, it next determines whether the requested movement is to be horizontal or vertical if the keystroke requires vertical movement of the cursor it is processed according to steps which will be hereinafter described. If the keystroke requires horizontal movement of the cursor, the WSC next determines whether the present cursor position is within an entry field. If the present cursor position is within an entry field, the cursor movement will be controlled as a text cursor; if not, the cursor movement will be controlled as will be hereinafter described. Assuming the present cursor position to be within an entry field, the WSC next determines whether the text cursor is in an end position in an entry field; if so, the subsequent processing occurs as will be hereinafter described. If not, the cursor target position is incremented or decremented horizontally, in the direction of movement dictated by the keystroke, and the text cursor display remains turned on (FIG. 7C). A command signal is sent by the WSC to the DWS to move the text cursor to the new target position.

The foregoing analysis steps within the WSC are all presumptive of movement of a text cursor. If any of the foregoing determinations do not yield the results as described above, the WSC presumes that the required cursor movement is a selection cursor. In this case, a determination is first made as to whether there are nay cursorable items in the direction of movement specified by the keystroke (FIG. 7B). If there are cursorable items in the direction of movement the selection cursor target is set to the next cursorable item in the direction of movement, and a determination is made whether the selection cursor is already active (FIG. 7C). If the selection cursor is already active, it must be deactivated from its present position, which is accomplished by restoring the original display attribute. In the case of a reverse image selection cursor display, this causes the reverse image to become restored to a normal image at the location of the currently active selection cursor. If the section cursor is not currently active this step is skipped.

The WSC next determines whether the next cursorable item in the direction of movement is within a selection cursor construct; if not, the cursor movement will again be treated as a text cursor movement, the text cursor display will be turned on and a command will be sent to move the text cursor to the new target position. If it is determined that the cursor movement will be entering a selection cursor construct, the text cursor display is turned off, the selection cursor display attribute is removed at the target position and saved, the selection cursor display is turned on at the target position, and a command is sent to the DWS to present the selection cursor reverse image over the new target position.

Referring to FIG. 7B, if a determination is made that there are no cursorable items in the direction of movement, either on this row (for "cursor left" or "cursor right") or on this column (for "cursor up" or "cursor down"), the WSC determines whether the keystroke signal falls within either of two categories: 1) a direction of movement either left or up, and 2) a direction of movement either right or down. These direction of movement choices require different processing steps. If the keystroke movement is left or up, the WSC determines whether the current cursor position is already in the top row of cursorable times in the panel. If not, a panel row indicator is decremented by a count of 1, and the processing steps return to the steps shown in FIG. 7A. If the current cursor position is in the top row of the panel, the panel row indicator is set to equal the bottom row number, and the processing steps continue as illustrated in FIG. 7B.

If the keystroke request is for a right or down movement direction, a determination is made as to whether the current cursor position is in the bottom row of the panel. If the current position is not in the bottom row of the panel the panel row indicator number is incremented by a count of 1, and the processing steps shown in FIG. 7A are accomplished. If the current cursor position is already in the bottom row of the panel, the panel row indicator is set to equal the top row of the cursorable panel item, and processing steps continue as shown in FIG. 7B.

A selection cursor construct is determined by the software format of the particular display screen, and it is described in the aforementioned IBM CUA publication.

The foregoing process is implemented within the WSC, with reference to each DWS connected to the WSC, at the time any cursor movement keystroke is made by a DWS user. Therefore, the WSC maintains a table of the respective cursor target positions for each of the DWS' to which it is connected. In this manner, the WSC may perform the foregoing process on a time-sharing basis with respect to all of the DWS devices to which it is connected, thereby permitting the use of a DWS with enhanced cursor movement functions, but without the necessity of enhancing the processing capability of the DWS.

Selection Cursor Construction

According to the CUA rules and procedures there are several defined constructs in which cursor movement is the primary method for user interaction. These constructs include selection fields and action bars, in which the user can select the desired choice by moving the cursor onto that choice and pressing defined selection keys. The selection cursor has heretofore been defined as a focal point for user interaction only in conjunction with PWS devices. In that regard, the selection cursor is preferably a reverse-image bar that covers whatever item; i.e., entry field, selection field choice, etc., is currently the user focal point. Alternatively, the selection cursor could also be presented in other ways, as for example an intense display of the relevant selection field choice, underscoring, etc. The present invention enables the rules and conventions for using selection cursors to be applied equally to DWS devices, to provide a uniform interface for user interaction on both DWS and PWS devices. This enhancement is accomplished by utilizing the WSC to provide the necessary support and management intelligence for the DWS selection cursor.

In accordance with the invention, the WSC presents the selection cursor on the DWS and moves the selection cursor when cursor movement keys are pressed by the user. The DWS selection cursor can be used to provide entry focus to choices in an action bar, choices in a selection field, entry fields, list items, and function keys listed in the function key area.

Figure 8:
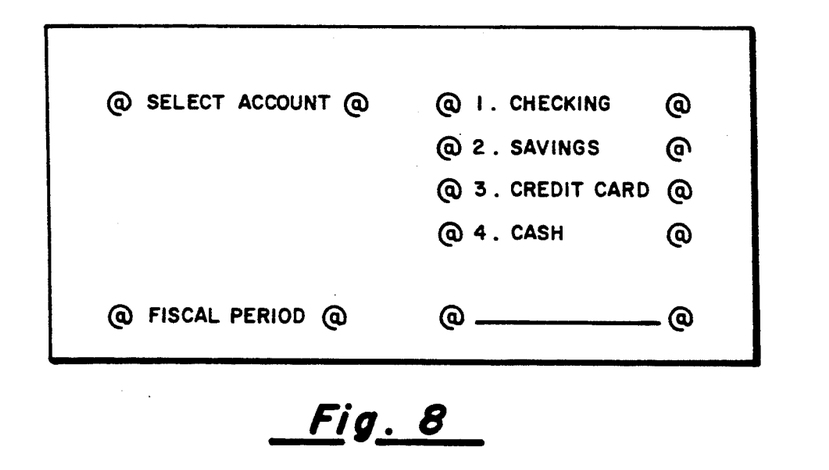
FIG. 8 shows a display panel example with display attributes.

Referring to FIG. 8, the display attributes which are utilized in conjunction with DWS devices are illustrated, in conjunction with an example display panel format. In FIG. 8, the "@" represents a display attribute, which typically occupies one screen position on a DWS, and appears on the screen as a space. According to the usual DWS internal operating conventions, a display attribute causes specified highlighting to appear and to continue in effect until a subsequent display attribute is encountered. PWS devices have a different convention for handling display attributes.

FIG. 8 shows two input fields; the first is a selection field, in which the user may select one of the four choices listed. The second field is an entry field, in which the user must type the requested data. Each field has a textual field prompt preceding it. Display attributes are found in connection with each cursorable item in the example of FIG. 8, wherein each selection field choice and entry field has a leading and trailing display attribute.

According to the invention, when the selection cursor is positioned over any cursorable item on the panel of FIG. 8, the WSC sets the associated leading display attribute to a reverse image. The display of the text cursor is deactivated unless the selection cursor is positioned over an entry field, in which case both cursors are active. The reverse image which becomes set by the leading attribute is continued in effect until a trailing attribute is encountered which would typically be a normal image attribute, at which point the reverse image is discontinued. In this manner, the DWS display panel develops the same appearance as a PWS display panel would have, in connection with the displaying of selection cursors. The user may use the cursor movement keys to move the selection cursor from item to item as has been previously described herein. In each case, the WSC manages the movement of the selection cursor by changing the display attribute settings of the current and the targeted panel items. In all cases, the WSC saves any modified display attributes and restores them when the selection cursor is moved to another cursorable item.

Figure 9:
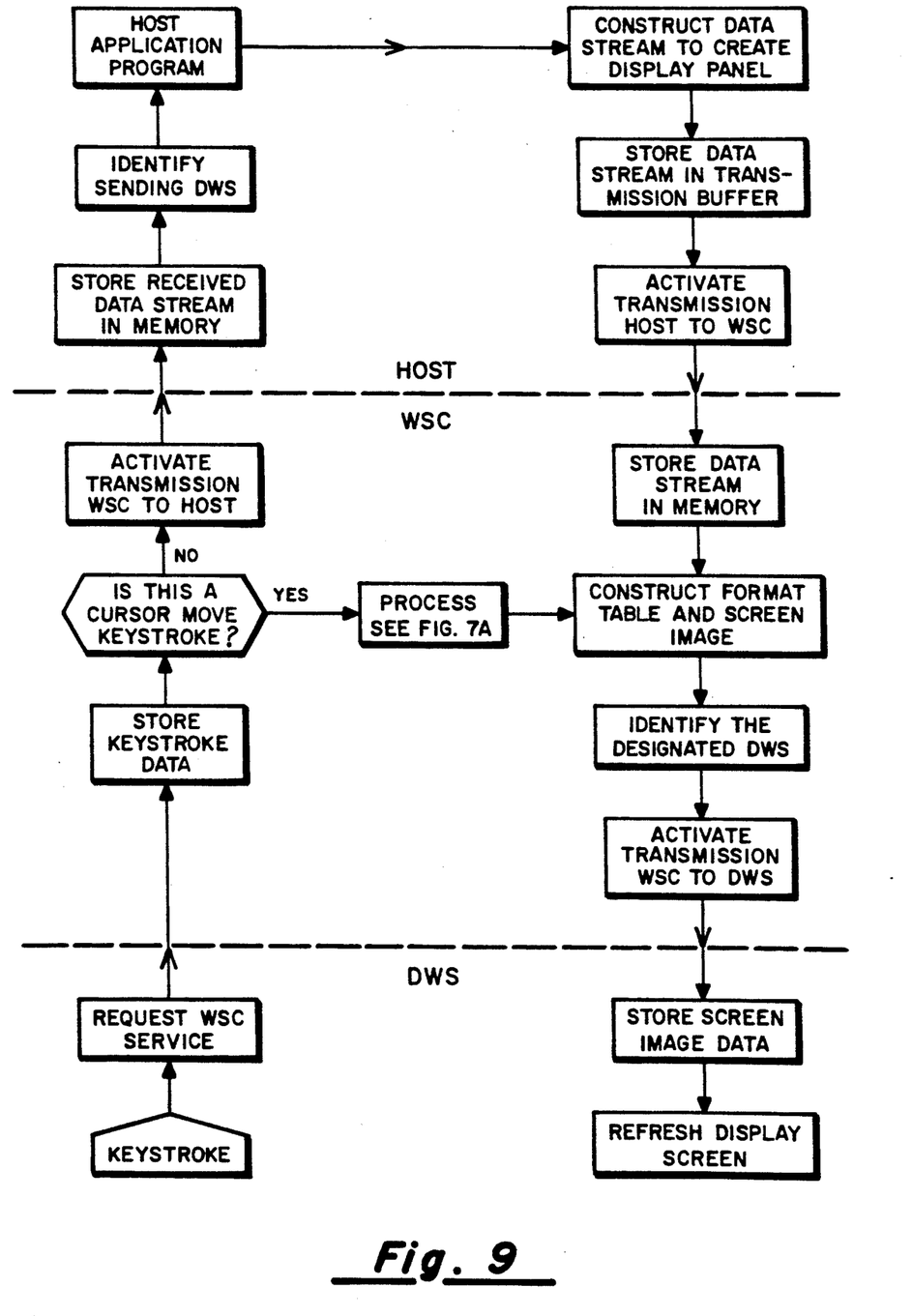
FIG. 9 is a general flow chart of the process for defining a display panel and processing certain keystrokes.

FIG. 9 shows a flow chart for the overall process. The host computer processor, through the execution of an application program, determines that a display panel is to be sent to a designated DWS. The host processor constructs a data stream, incorporating the display screen image, and other relative information relating to the various display panels to be included, definitions of fields, and activates a transmission of this data stream to the WSC. The WSC in turn constructs a format table and a screen image for the designated DWS, and activates a transmission to the DWS. The screen image is received by the DWS, stored in memory and is utilized to continually refresh the display screen.

When a DWS operator makes a keystroke, the DWS requests service from the WSC. The WSC then receives the keystroke data, stores it, and makes a determination of whether the keystroke data relates to a cursor movement keystroke, or any other keystroke which may be processed by the WSC. If not, the WSC activates a transmission of the keystroke data to the host processor, where it is received, identified and utilized by the host application program. If the keystroke data does relate to a cursor movement keystroke, the data is processed within the WSC as previously described. After this processing, the WSC constructs a new screen image for transmission to the DWS, and completes the transmission as described earlier.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. For example, the description herein has focused upon the novel method of processing certain cursor keystroke movement and presentation functions within a WSC, serving a plurality of DWS devices on a time-sharing basis. In particular systems, workstation controllers may be nonexistent, and the functions normally performed by workstation controllers may be in fact performed by the host processor itself. In these situations, the novel methods described herein may equally well be performed on a time-sharing basis by the host processor, serving a plurality of DWS devices, wherein the host processor performs functions normally considered to be workstation controller functions.

What is claimed is:

1. A method of expanding and enhancing cursor control and display in a plurality of dependent workstations connected to a workstation controller, comprising the steps of:
   a) prestoring, in said workstation controller, format tables to describe cursorable panel items, including selection fields and entry fields relating to cursor position and display, for each of said plurality of dependent workstations;
   b) asynchronously receiving cursor keystroke signals in said workstation controller from any of said plurality of dependent workstations;
   c) identifying, within said workstation controller, as to each of said asynchronously received cursor keystroke signals, the particular dependent workstation from which such signal is received, and retrieving the format tables for such dependent workstation;
   d) developing, within said workstation controller, a new cursor target position and display screen image at an input-capable position corresponding to the particular received cursor keystroke signal and the particular dependent workstation format table; and
   e) transmitting the new display screen image to the particular dependent workstation to modify the cursor position and display image on said workstation corresponding to the new cursor target position and display screen image.

2. The method of claim 1, wherein the step of developing a new cursor target position further comprises testing said new cursor target position to determine that said new position is an input-capable position.

3. A method of controlling cursor movement on a plurality of dependent workstation display screens from a single workstation controller comprising the steps of:
   a) prestoring, in said workstation controller, a plurality of format tables to designate selection fields and entry fields and cursor definitions, wherein said plurality of format tables includes at least one format table as to each of the plurality of dependent workstations;
   b) independently receiving cursor keystroke signals from each of said plurality of dependent workstations into said controller;
   c) comparing each received cursor keystroke signal in said workstation controller with the format table for the corresponding dependent workstation to target a cursor type and position; and
   d) transmitting a display screen image signal from the workstation controller to the respective dependent workstation, for each received keystroke signal, to initiate a cursor display on the workstation corresponding to the targeted type and position.

4. The method of claim 3, wherein the step of comparing further comprises determining whether the target cursor position is in an entry field, and targeting a text cursor type in a new entry field position if true.

5. The method of claim 4, wherein the step of comparing further comprises determining whether the last cursor position was an end position in an entry field.

6. A method of processing a cursor movement keystroke signal for a dependent workstation in a processor remote from said dependent workstation, comprising the steps of:
   a) prestoring a format table in said remote processor, said format table defining display fields, including entry and selection fields;
   b) comparing said dependent workstation keystroke signal with the data in said format table, said comparison being made in said remote processor, to determine whether a text cursor or selection cursor is responsive to said signal, and locating an input-capable position for said cursor;
   c) transmitting from said remote processor a display screen image signal to the dependent workstation which generated the cursor movement keystroke signal, said display screen image signal, including signals to determine cursor display position and type.

* * * * *